(12) United States Patent
Lunde et al.

(10) Patent No.: US 12,678,807 B2
(45) Date of Patent: *Jul. 14, 2026

(54) 3-D PRINTED VARIABLE PATTERN NOZZLE

(71) Applicant: Technifex Products LLC, Valencia, CA (US)

(72) Inventors: Montgomery C. Lunde, Marina Del Rey, CA (US); Leonard M. Aboulache, Valencia, CA (US)

(73) Assignee: Technifex Products LLC, Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/397,042

(22) Filed: Nov. 21, 2025

(65) Prior Publication Data

US 2026/0097407 A1 Apr. 9, 2026

Related U.S. Application Data

(62) Division of application No. 18/510,367, filed on Nov. 15, 2023, now Pat. No. 12,478,987.

(Continued)

(51) Int. Cl.
  *B05B 1/12* (2006.01)
  *B05B 17/08* (2006.01)
  (Continued)

(52) U.S. Cl.
  CPC .............. *B05B 1/12* (2013.01); *B05B 17/08* (2013.01); *F21V 33/006* (2013.01); *B33Y 80/00* (2014.12); *F21W 2121/02* (2013.01)

(58) Field of Classification Search
  CPC .......... B05B 1/12; B05B 1/3426; B05B 17/08
  See application file for complete search history.

(56) References Cited

U.S. PATENT DOCUMENTS 3,558,053 A 1/1971 Hruby, Jr.
3,645,449 A 2/1972 Hruby, Jr.
        (Continued)

FOREIGN PATENT DOCUMENTS

CN   101180132 B   11/2010
CN   111185313 A   5/2020
        (Continued)

OTHER PUBLICATIONS

English Translation of the Abstract from CN101180132A, 1 pp. downloaded on Oct. 27, 2023.
        (Continued)

*Primary Examiner* — James Sanders
(74) *Attorney, Agent, or Firm* — James A. Sheridan; Sheridan Law, LLC

(57) ABSTRACT

A monolithic 3-D printed nozzle assembly that produces a variable water pattern includes a first translucent hollow section portion that receives a first stream of water and provides a linear stream of water moving along a longitudinal axis of the first section. A translucent tangential injector portion integrally formed with the first section defines at least one passageway. The injector portion receives a second stream of water and directs it to rotate about a rotational axis using the passageway(s). A second translucent hollow section portion integrally extends from the first section and receives the linear stream of water from the first section and the second stream of water rotating about the rotational axis from the tangential injector, providing a third stream of water formed therefrom. A third translucent hollow section portion integrally extends from the second section and receives the third stream of water, directing it to an exterior environment.

17 Claims, 12 Drawing Sheets
(8 of 12 Drawing Sheet(s) Filed in Color)

Related U.S. Application Data

(60) Provisional application No. 63/425,597, filed on Nov. 15, 2022.

(51) Int. Cl.
| | |
|---|---|
| *F21V 33/00* | (2006.01) |
| *B33Y 80/00* | (2015.01) |
| *F21W 121/02* | (2006.01) |

(56) References Cited

U.S. PATENT DOCUMENTS

| | | | |
|---|---|---|---|
| 3,690,554 | A | 9/1972 | Hruby, Jr. |
| 3,773,258 | A | 11/1973 | Hruby, Jr. |
| 3,782,629 | A | 1/1974 | Hruby, Jr. |
| 4,205,785 | A | 6/1980 | Stanley |
| 5,169,065 | A | 12/1992 | Bloch |
| 6,250,570 | B1 | 6/2001 | Starr et al. |
| 6,626,368 | B2 | 9/2003 | Nakayama et al. |
| 7,819,345 | B2 | 10/2010 | Shoap |
| 7,850,098 | B2 | 12/2010 | Vogel et al. |
| 7,942,350 | B2 | 5/2011 | Shoap |
| 8,042,748 | B2 | 10/2011 | Hagaman |
| 8,162,234 | B2 | 4/2012 | Wesselmeier |
| 8,177,141 | B2 | 5/2012 | Hagaman |
| 8,215,569 | B2 | 7/2012 | Johnson |
| 8,348,180 | B2 | 1/2013 | Mao et al. |
| 8,424,781 | B2 | 4/2013 | Rosko et al. |
| 8,523,087 | B2 | 9/2013 | Hagaman |
| 9,216,427 | B2 | 12/2015 | Grant |
| 9,315,974 | B2 | 4/2016 | Brown et al. |
| 9,433,949 | B2 | 9/2016 | Wesselmeier |
| 9,914,146 | B2 | 3/2018 | Vogtner et al. |
| 9,962,718 | B2 | 5/2018 | Vogel et al. |
| 10,081,030 | B2 | 9/2018 | Fuller et al. |
| 10,315,214 | B2 | 6/2019 | Vogtner et al. |
| 10,618,066 | B2 | 4/2020 | Rosko et al. |
| 10,780,450 | B2 | 9/2020 | Fuller et al. |
| 11,267,003 | B2 | 3/2022 | Vogel et al. |
| 2004/0129794 | A1 | 7/2004 | Deichmann et al. |
| 2006/0163347 | A1 | 7/2006 | Wooten |
| 2007/0194148 | A1 | 8/2007 | Rosko et al. |
| 2009/0071665 | A1 | 3/2009 | Shoap |
| 2010/0155497 | A1 | 6/2010 | Hagaman |
| 2010/0155498 | A1 | 6/2010 | Hagaman |
| 2010/0288366 | A1 | 11/2010 | Shoap |
| 2013/0119149 | A1 | 5/2013 | Brown et al. |
| 2013/0200179 | A1 | 8/2013 | Buelow et al. |
| 2018/0257093 | A1 | 9/2018 | Glezerman et al. |
| 2021/0023574 | A1 | 1/2021 | Ryon et al. |
| 2021/0164647 | A1 | 6/2021 | Huber et al. |

FOREIGN PATENT DOCUMENTS

| | | |
|---|---|---|
| CN | 11243967 A | 3/2021 |
| DE | 10 2013 005 972 A1 | 10/2014 |
| EP | 3 922 409 A1 | 12/2021 |
| JP | 2004-057936 A | 2/2002 |
| JP | 2002-102809 A | 4/2002 |
| WO | 2009/039126 A1 | 3/2009 |
| WO | 2014/166563 A1 | 10/2014 |

OTHER PUBLICATIONS

English Translation of the Abstract from CN111185313A, 1 pp. downloaded on Oct. 27, 2023.

English Translation of the Abstract from CN112439967, 1 pp. downloaded on Oct. 27, 2023.

English Translation of the Abstract from DE 10 2013 005 972, 1 pp. downloaded on Oct. 27, 2023.

English Translation of the Abstract from JP2002-102809, 1 pp. downloaded on Oct. 27, 2023.

English Translation of the Abstract from JP2004-057936, 1 pp. downloaded on Oct. 27, 2023.

3-D PRINTED VARIABLE PATTERN NOZZLE

REFERENCE TO PENDING PRIOR PATENT APPLICATION

This application claims the benefit under 35 U.S.C. 119(e) of U.S. Provisional Patent Application No. 63/425,597, filed Nov. 15, 2022, by Montgomery C. Lunde and Leonard M. Aboulache, and entitled "3-D Printed Variable Pattern Nozzle," which patent application is hereby incorporated herein by reference.

FIELD OF THE INVENTION

This disclosure is directed to a water nozzle assembly for producing variable water patterns.

BACKGROUND

Generally, there are several types of water nozzles that provide the ability to vary the pattern of the discharged water. For example, the typical fire hose nozzle provides the operator with ability to produce a discharge of water with a pattern that can be varied between a relatively thin stream of water and a wide conical spray. The operator controls the pattern by actuating a lever that, in turn, varies the position of a plug within the nozzle.

Another type of nozzle permits the pattern of the discharge pattern to be only one of either a relatively thin stream of water or a wide conical spray. The relatively thin stream of water is produced by supplying water to the first of two pairs of inlet ports to the nozzle, while not providing any water to the second pair of inlet ports. To produce the wide conical spray, water is provided to the second pair of inlet ports but not to the first pair of inlet ports.

As one of skill in the art would appreciate, the term "additive manufacturing" refers to the process of adding material to an object. "3-D printing" is typically the construction of a three-dimensional object from a Computer Aided Drafting (CAD) model, a digital 3-D model, or the like. 3-D printing can be carried out in a variety of processes in which material is deposited, joined or solidified under computer control, with the material being added together (such as plastics, liquids or powder grains being fused), typically layer by layer. In additive manufacturing an object is made by adding material rather than removing (subtracting) material. Thus, 3-D printing is a type of additive manufacturing. Thus, as used herein, "3-D printing," and the like, encompasses various forms of additive manufacturing.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Embodiments of a monolithic 3-D printed nozzle assembly configured to produce a variable water pattern include a first translucent hollow section portion having an integrally formed translucent wall portion. The first hollow section portion receives a first stream of water and provides a linear stream of water moving along a longitudinal axis of the first translucent hollow section portion. A translucent tangential injector portion is integrally formed with the first translucent hollow section portion. The translucent tangential injector portion defines at least one passageway. The translucent tangential injector portion receives a second stream of water and directs the second stream of water to rotate about a rotational axis using the passageway(s). A second translucent hollow cylindrical section portion that includes the translucent wall portion of the first hollow portion, integrally extends from the first hollow section portion. The second translucent hollow section portion receives the linear stream of water from the first hollow cylindrical section portion and the second stream of water rotating about the rotational axis from the tangential injector portion, such that the rotational axis is other than perpendicular to the longitudinal axis. This provides a third stream of water formed from the first and second streams of water. A third translucent hollow section portion that integrally extends from the second hollow section portion receives the third stream of water and directs the third stream of water to an exterior environment.

In these and other embodiments of a monolithic 3-D printed nozzle assembly the second hollow section portion may define the tangential injector, and integrally formed tangential diffuser or the like, such as in the translucent wall portion. The passage(s) may (each) have an exit port (that are arranged in a circle). To wit, the second hollow section portion may define an integrally formed plenum defined between the translucent wall portion of the first hollow portion and an outer translucent wall portion of the second hollow portion. This plenum may include an integrally formed inlet port receiving the second stream of water and the integrally formed tangential diffuser. In various embodiments, the second hollow section portion may include the integrally formed plenum, defining a torus shape and the integrally formed inlet port located to direct at least a portion of the second stream of water with a tangential component relative to a radius of the plenum torus shape.

In various embodiments a nozzle tip portion may receive the third stream of water and direct the third stream of water into the exterior environment via an orifice. The nozzle tip portion may be translucent and integral with the third hollow section portion (and thereby the second hollow section portion and the first hollow section portion).

In light of the foregoing, an embodiment of a method for producing a variable lighted water pattern may include selectively providing a first stream of water to a first end of a translucent cylindrical tube and selectively providing a second stream of water to a structure integrally formed with the translucent cylindrical tube that causes the second stream of water to rotate about a rotational axis. The first stream of water may then be merged with the second stream of water in the translucent cylindrical tube, such that the longitudinal axis of the translucent cylindrical tube is other than perpendicular to the rotational axis of the second stream of water, such that the first and second streams of water forming a third stream of water. The third stream of water may then be provided to an exterior environment, from the translucent cylindrical tube. The volume of the first stream of water, may be varied to change a height of the third stream of water in the exterior environment and/or the volume of the second stream of water may be varied to change a lateral dispersion of the third stream of water in the exterior environment. Further, light may be directed through and/or about the translucent cylindrical tube, illuminating the translucent cylindrical tube and/or the water streams.

Thus, in various embodiments, a lighting assembly directs light through at least the first translucent hollow section portion, the second translucent hollow section portion, and the third translucent hollow section portion, illuminating the monolithic 3-D printed nozzle assembly and/or the water streams. The lighting assembly may be a light emitting diode (LED) ring assembly positioned about the monolithic 3-D printed nozzle assembly and/or an LED light source positioned at an end in opposition to the third translucent hollow section portion directing the third stream of water to the exterior environment. Also, the first hollow section portion may include an integrally formed lens configured to receive light from the LED light source.

Also, in various embodiments, the monolithic 3-D printed nozzle assembly may include an attachable object top providing an orifice for water flow which may be translucent to allow illumination from the lighting assembly.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

The patent or application file contains at least one drawing executed in color. Copies of this patent or patent application publication with color drawings will be provided by the Office upon request and payment of the necessary fee.

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIG. 3 is a fragmented, generally vertical, generally cross-sectional, diagrammatic side elevation view of the example embodiment 3-D printed variable pattern nozzle of FIG. 2, or the like;

DETAILED DESCRIPTION

Figure 3:
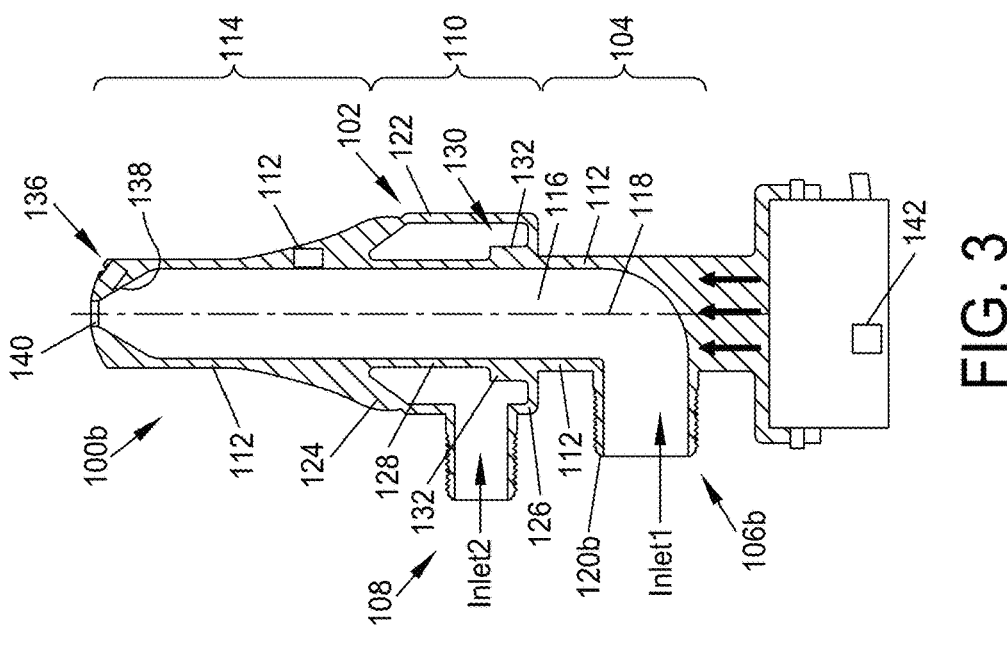

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

For example, as used herein, the terms "3-D printing," "3-D printed," and the like, encompasses various forms of additive manufacturing. Additive manufacturing is a process of adding material to an object. For example, construction of a three-dimensional object from a Computer Aided Drafting (CAD) model, a digital 3-D model, or the like. 3-D printing can be carried out in a variety of processes in which material is deposited, joined or solidified under computer control, with the material being added together (such as plastics, liquids or powder grains being fused), generally layer by layer.

Generally, embodiments of the present systems and methods are directed to a monolithic, 3-D printed, nozzle assembly that operates to mix a first stream of water that is flowing in a linear direction with a second stream of water that is rotating about an axis to produce a third stream of water for discharge to the exterior environment in a pattern which is determined by the characteristics of the first and second streams of water. By varying the characteristics of the first and second streams of water, the pattern of the water discharged from the monolithic, 3-D printed nozzle assembly can be varied. Besides water, other liquid media may be utilized in the present systems and methods. This liquid media may include, but is not limited to, flammable liquids, and these may further include, but are not limited to, liquid propane, and Isopar™ fluids from ExxonMobil. Reference is hereby made to U.S. Pat. No. 6,250,570, issued Jun. 26, 2001, entitled "Variable Pattern Nozzle," the disclosure of which is incorporated herein by reference.

With reference now to FIGS. 1 through 4, and in various embodiments, there may be provided a 3-D printed nozzle assembly, such as illustrated monolithic 3-D printed variable pattern nozzle assembly 100 described below. 3-D printing a nozzle assembly may provide one or more benefits over other fabrication techniques. These benefits may include, but are not limited to, enhanced aesthetics, various entertainment options, or additional display formats in front of guests or an audience.

FIGS. 1 through 4 illustrate a monolithic 3-D printed variable pattern nozzle assembly (100) of a clear, translucent material configured to direct light from a LED light fixture therethrough, such as described further below, with respect to FIGS. 9 through 19. However, in various embodiments, the 3-D printed nozzle assembly may be formed of opaque material or have both opaque portions and translucent portions. The 3-D printed nozzle assembly may be formed of one or more materials that provide a clear or translucent body for most or all of the materials. The various embodiments of the monolithic 3-D printed variable pattern nozzle assembly may provide advantages and features not available using traditional fabrication techniques. Further, the 3-D printed nozzle assembly may provide a more cost-effective component in general, and may provide more cost effective interaction with various systems used to create a fountain display, than traditional nozzle assemblies which are formed with traditional, separate, non-3-D printed components.

Figure 2:
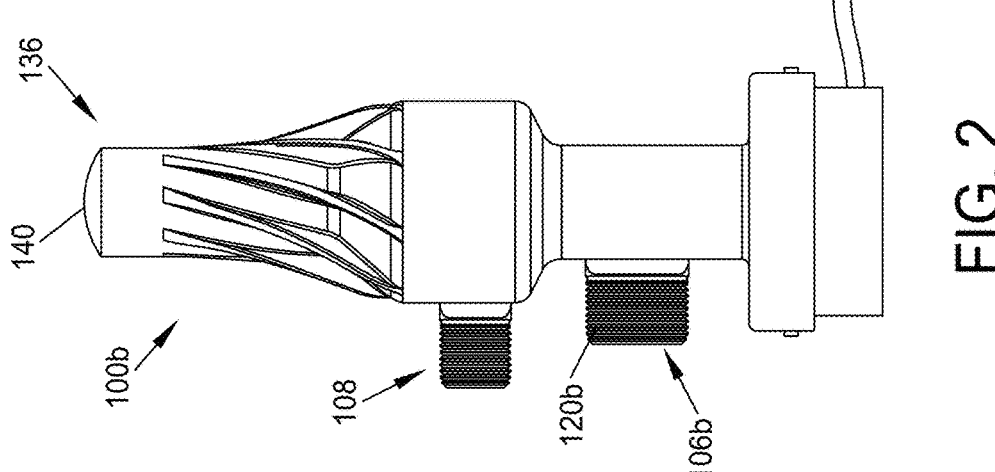
FIG. 2 is a side elevation view of another example embodiment of the present 3-D printed variable pattern nozzle.
Figure 1:
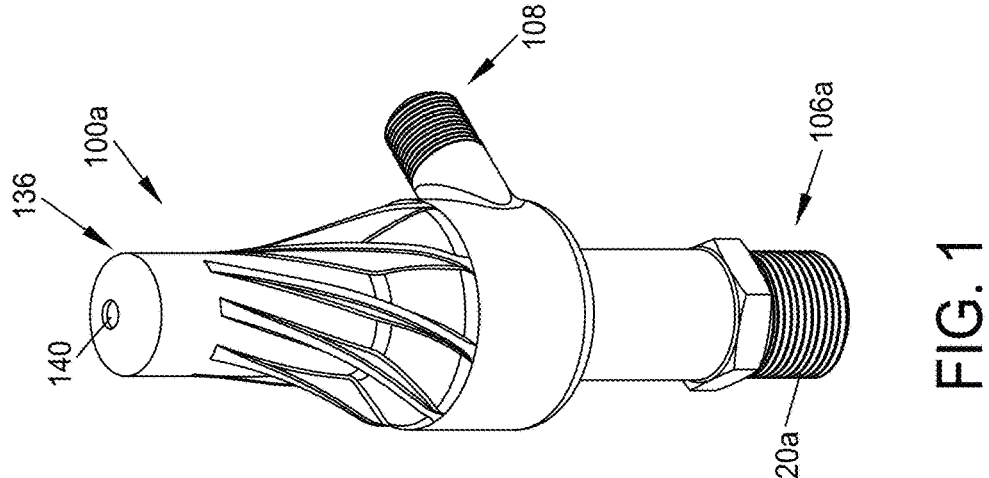
FIG. 1 is a perspective view of an example embodiment of the present 3-D printed variable pattern nozzle.
Figure 4:
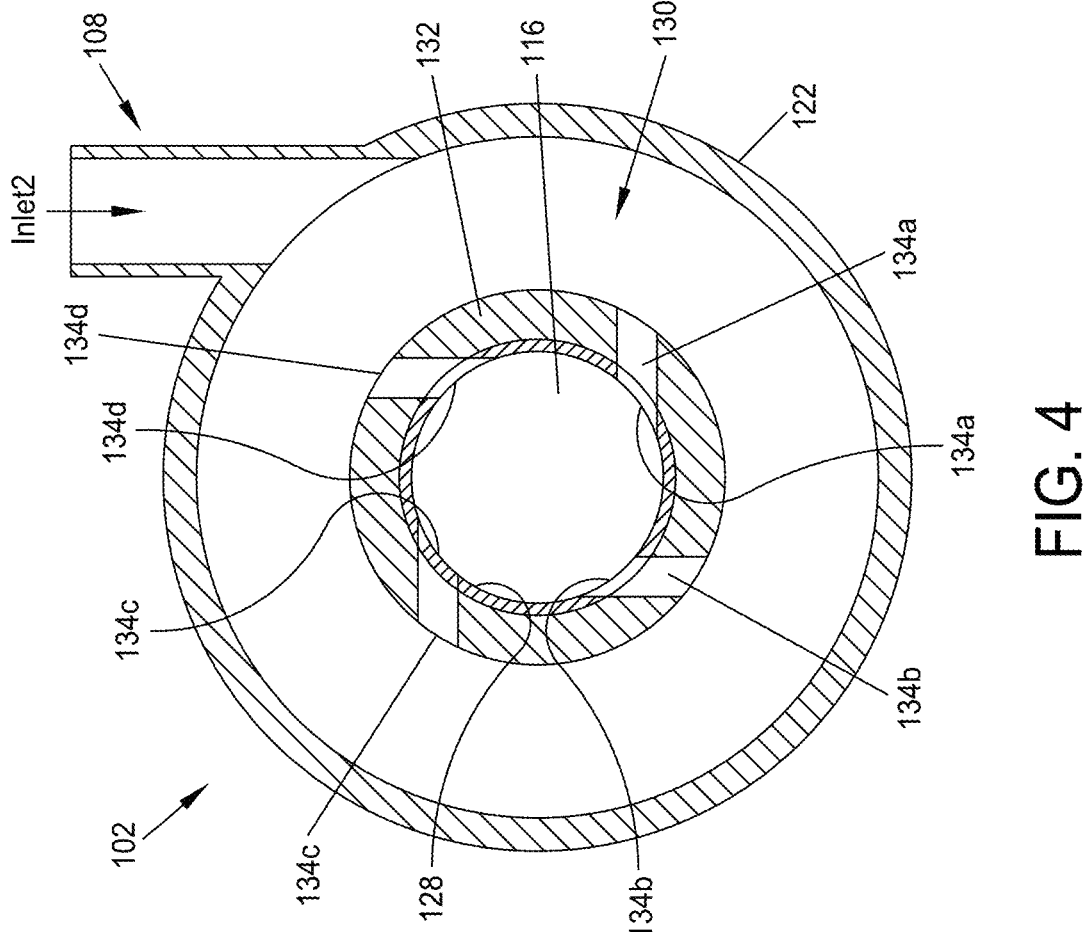
FIG. 4 is a fragmented, generally horizontal, generally cross-sectional, diagrammatic top view of the example embodiment 3-D printed variable pattern nozzle of FIG. 1, or the like, showing a tangential injector of the 3-D printed variable pattern nozzle.

Specifically, FIG. 1 is a perspective view of example embodiment 100a of the present 3-D printed variable pattern nozzle, FIG. 2 is a side elevation view of other example embodiment 100b of the present 3-D printed variable pattern nozzle, FIG. 3 is a fragmented, generally vertical, generally cross-sectional, diagrammatic side elevation view of example embodiment 100b of the 3-D printed variable pattern nozzle of FIG. 2, and FIG. 4 is a fragmented, generally horizontal, generally cross-sectional, diagrammatic top view of example embodiment 100a of the 3-D printed variable pattern nozzle of FIG. 1, showing tangential injector portion 102 of the 3-D printed variable pattern nozzle. It should be appreciated that both monolithic 3-D printed variable pattern nozzle 100a and monolithic 3-D printed variable pattern nozzle 100b share common operative structure, such as tangential injector portion 102. Therefore, various embodiments of the present monolithic 3-D printed variable pattern nozzle shall be referenced as "monolithic 3-D printed variable pattern nozzle assembly 100," or the like, herein, other than when structure specific to monolithic 3-D printed variable pattern nozzle 100a or 100b is specifically called-out below.

With reference variously to FIGS. 1 through 4 various embodiments of monolithic 3-D printed variable pattern nozzle 100 are described. Generally, monolithic 3-D printed variable pattern nozzle assembly 100 includes first translucent (hollow cylindrical) section portion 104, which receives a first stream of water (Inlet1) 106 (106a in assembly 100a and 106b in assembly 100b). Inlet1 106 directs the first stream along a linear path. Translucent tangential injector portion 102 is integrally formed with the first translucent section portion, receives a second stream of water (Inlet2) 108 and directs the second stream of water such that the stream turns about a rotational axis. Second translucent (hollow cylindrical) section portion 110, which may be integrally formed, at least in part from translucent wall portion 112 of the first translucent hollow section portion. Second translucent section portion 110 brings together the first and second streams of water. Third translucent (hollow cylindrical) section portion 114 provide the third stream of water to the exterior environment with a pattern that is dictated by characteristics associated with the first and second streams of water (i.e., "Inlet1" and "Inlet 2," respectively).

First translucent section portion 104 (e.g., wall portion 112) defines a cylindrical tube 116 with a longitudinal axis 118. (Threaded) coupler 120 (120a, in FIGS. 1 and 120b in FIGS. 2 and 3), formed integral with cylindrical tube 116, attaches the nozzle to plumbing, which (selectively and variably) supplies the first stream of water. Other types of coupling devices are also contemplated herein (e.g., quick connects, barbed couplers, etc.). In some embodiments, a flow straightening device may be associated with (e.g., defined in, or by) first section portion 104, and may be located in Inlet1. Such a flow straightening device may operate to remove rotation or twist in the first stream of water, such as in Inlet 1. Thusly, by way of example, first hollow section portion 104 may include an integrally formed flow straightener formed with unitary wall 112 with this portion of the first hollow section portion, and thereby, the integrally formed flow straightener may be configured for removing rotation present in the first stream of water.

Tangential injector portion 102 may take the form of a tangential diffuser, which, with attention directed to FIGS. 3 and 4, may include torus-shaped housing 122 with cylindrical translucent wall portion 112, circumferential upper wall 124, circumferential lower wall 126 and portion 128 of cylindrical tube 116. Housing 122 defines (is) a plenum chamber that receives the second stream of water. Upper wall 124 and lower wall 126 are integral with cylindrical tube 116 in a water-tight, monolithic manner.

Monolithic 3-D printed variable pattern nozzle assembly 100 may be configured to eliminate any requirement to assemble various components and creates a single, complete variable pattern nozzle That is, embodiments of present variable pattern nozzle 100 are, as noted, 3-D printed from plastic, or the like, as a (one) monolithic piece, avoiding (or at least minimizing) the use of adhesives, fasteners, and in accordance therewith, no assembly of variable pattern nozzle 100 is required (at all).

Tangential injector portion 102 also includes inlet port 108 for directing the second stream of water into plenum chamber 122. Inlet2 port 108 may also be threaded to attach the nozzle to plumbing, which (selectively and variably) supplies the second stream of water. Inlet2 port 108 is located so as to direct the second stream of water into plenum chamber 122 in a direction that is substantially tangential, or perpendicular, to a radius of the cylindrical outer wall 112 of chamber 122.

More specifically, illustrated tangential injector portion 102 includes integrally formed tangential diffuser 130, which directs the second stream of water, immediately before it is mixed with the first stream of water, so that the stream rotates about a rotational axis. In various embodiments, the rotational axis coincides with longitudinal axis 118 along which the first stream of water is moving. That is, second hollow section portion 110 may include tangential diffuser 130 integrally formed with unitary wall 112 of this portion of the second hollow section portion. The integrally formed tangential diffuser may include a plurality of passages for directing the second stream of water about the rotational axis. In particular, tangential diffuser 130 may be defined by integral collar 132 with passages 134a through 134d that direct the second stream of water to rotate about the rotational axis. Each of passages 134a through 134d includes an entry port, which receives a portion of the second stream of water and an exit port that exits into tube 116. In various embodiments, tangential diffuser 130 is integrally formed with lower wall 126 of chamber 122, as well as tube 116, as illustrated. However, alternatively (or additionally) tangential diffuser 130 may be integrally formed with upper wall 124 of chamber 122, as well as tube 116, or integrally formed with tube 116 (wall portion 112) alone.

Second section portion 110 is the portion of the cylindrical tube 116 at which the first stream of water carried by first translucent hollow section portion 104 and the second stream of water provided by tangential injector portion 102 are mixed to form the third stream of water. Second portion 110 includes the portion of cylindrical tube 116 with passages 134a through 134d that are aligned with passages 134a through 134d of the tangential diffuser.

Third section portion 114 receives the third stream of water produced by the mixing of the first and second streams of water by second section portion 110. Integral third section portion 114 includes a portion of cylindrical tube 116 and nozzle tip 136, integral to cylindrical tube 116. Nozzle tip 136 may include inner surface 138 and orifice 140 for directing the third stream of water into the exterior environment. Inner surface 138 has a longitudinal cross-section that tapers towards orifice 140. In the illustrated embodiment, the longitudinal cross-section of nozzle tip 136 is ogive. However, the longitudinal cross-section of nozzle tip 136 may, in some (other) embodiments, be U-shaped, V-shaped, or the like. By having inner surface 138 thusly taper towards the orifice any rotational component in the third stream of water is accelerated to make the resulting spray pattern have a broader or wider conical shape than it would have otherwise.

As noted, monolithic 3-D printed variable pattern nozzle 100 is capable of producing a spray that can be varied based upon the characteristics of the two streams of water that can be selectively applied to nozzle assembly 100. FIG. 5A through E are side elevation views of example embodiment 3-D printed variable pattern nozzle 100 showing various discharge patterns 500a through 500e, respectively. That is, FIG. 5A through E illustrate exemplary embodiment of monolithic 3-D printed variable pattern nozzle assembly 100 in which various water flow inputs create various stream and fan water flow outputs. First example 5A illustrates first stream at 100-percent to provide vertical jet stream 500a, with no fan stream component therewith. In second example 5B, the inputs are reversed with the second stream at 100-percent to provide fan stream 500b, with no vertical jet stream component therewith. The remaining three exemplary configurations 5C through 5E illustrate mixed amounts of vertical jet and fan streams, 500c through 500e, based on the pressure input to each of the first stream and the second stream relative to one another. With reference to FIGS. 5A through 5E, operation of nozzle 100 is described, in accordance with the foregoing.

Figures 5A, 5B, 5C, 5D, 5E, 6, 7, 8:
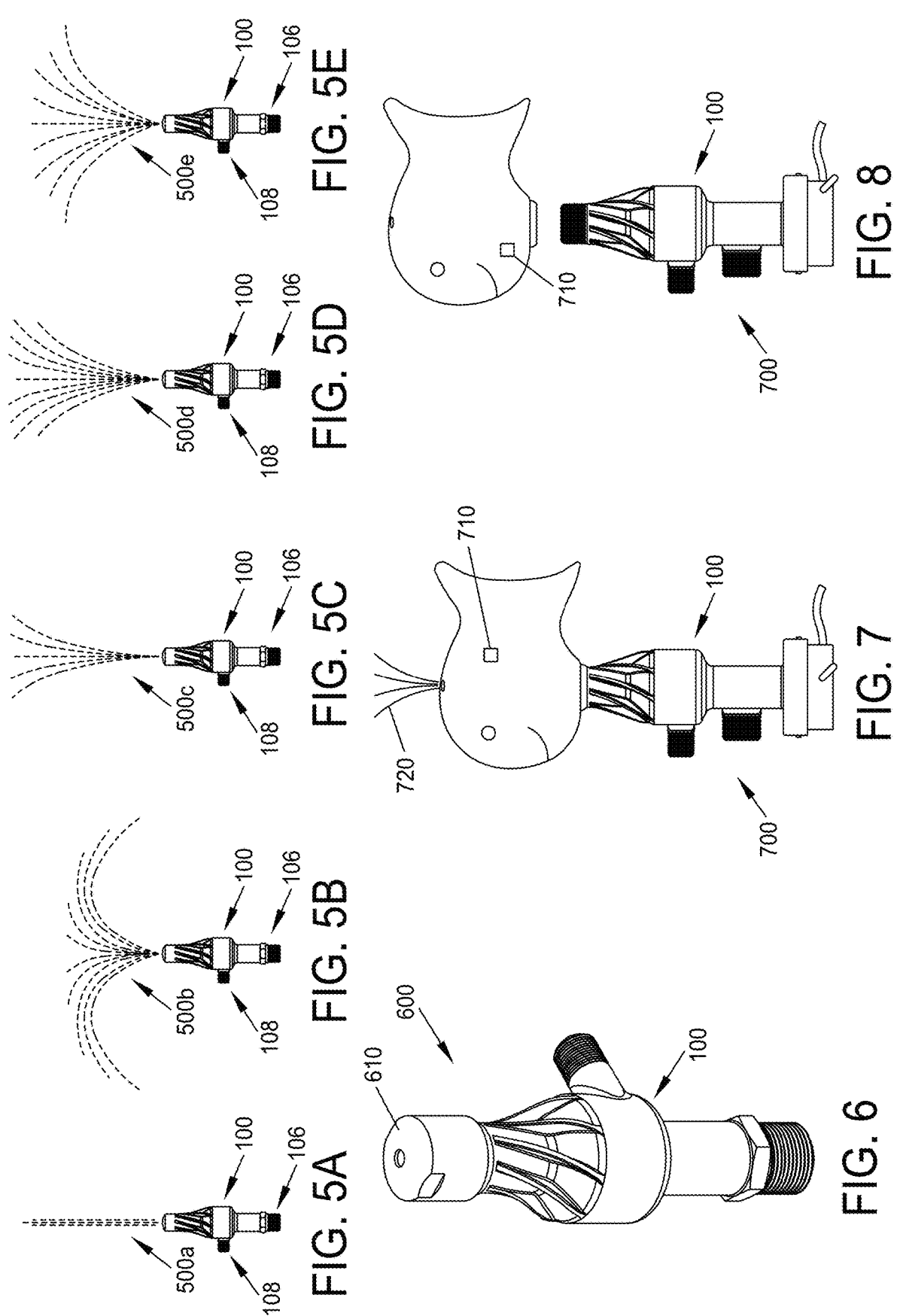
FIGS. 5A through 5E are side elevation views of an example embodiment of the present 3-D printed variable pattern nozzle showing various discharge patterns.
FIG. 6 is a perspective view showing an embodiment of a removable nozzle tip provided with an embodiment of the FIG. 1 present 3-D printed nozzle assembly.
FIG. 7 is side diagrammatic elevation illustration of an embodiment a removable object top deployed together with the FIG. 2 embodiment of the present 3-D printed nozzle assembly for selective illumination of the 3-D printed nozzle assembly, water flow, and object top.
FIG. 8 is a partially exploded side diagrammatic elevation illustration of the embodiment of the removable object top deployed together with the FIG. 2 embodiment of the present 3-D printed nozzle assembly from FIG. 7.

When a first stream of water is applied to first translucent hollow section portion 104 but no water is supplied to the tangential injector portion 102, the "third" stream of water ejected from orifice 140 is relatively thin stream of water 500a, as shown in FIG. 5A. That is, in this case, the first stream of water of water is supplied to monolithic 3-D printed variable pattern nozzle assembly 100 via Inlet1 port 106 and passes through second section portion 110 of the assembly substantially unaffected due to the lack of a second stream of water, due to a lack of any rotational component, and the third stream of water exiting the second section portion 110 (which is equivalent to the first stream of water in this case) passes through the third section portion 114 substantially unaffected and exits orifice 140 as a relatively thin stream of water. In accordance therewith, increasing the pressure of the first stream of water applied to monolithic 3-D printed variable pattern nozzle assembly 100 increases the height or length (and, to some degree, the width) of thin stream 500a of water exiting orifice 140, while decreasing the pressure of the first stream of water applied to monolithic 3-D printed variable pattern nozzle assembly 100 decreases the height or length (and, to some degree, the width) of thin stream 500a of water exiting orifice 140.

When only a "second" stream of water is applied to tangential injector portion 102 but no water is supplied to first section portion 104, the resulting "third" stream of water ejected from orifice 140 has relatively broad conical pattern 500b shown in FIG. 5B. That is, in this case, a stream of water is only injected into housing 122 via Inlet2 port 108. The tangential injection of this stream of water via Inlet2 port 108 and the cylindrical outer wall 112 cooperate to create a circular flow that reduces random turbulence in the water and aids in reducing any differences in the hydraulic conditions existing at the entry ports to each of passages 134a through 134d of tangential diffuser 130. This stream of water passes through passages 134a through 134d and enters the second section portion 110 with a rotation or spin that is substantially centered about longitudinal axis 118. Further, the size of passages 134a through 134d may be chosen so as to reduce these differences in the water pressure present at the entry ports of each of the passages 134a through 134d of tangential diffuser 130. Since there is not a "first" stream of water (entering via Inlet1 106), the "third" stream of water output by second section portion 104 is composed solely of this "second" stream of water provided by tangential diffuser 130. This "third" stream of water is applied to the third section portion 114 of the assembly. As noted above, due to the rotational aspect of the "third" stream of water, ogive inner surface 138 of nozzle tip 136 causes the rotational velocity of this "third" stream of water to increase as the water nears orifice 140. As a result, the spray output by orifice 140 has a wider or broader conical pattern than it would otherwise, as shown in FIG. 5B. Increasing the pressure of the "second" stream of water applied to monolithic 3-D printed variable pattern nozzle assembly 100 (via 2Inlet port 108) increases the relative width or breadth of conical pattern 500b. Likewise, decreasing the pressure of the "second" stream of water applied to monolithic 3-D printed variable pattern nozzle assembly 100 (via 2Inlet port 108) decreases the width or breadth of this conical pattern.

With attention directed to FIGS. 5C through 5E, when both first and second streams of water are applied to monolithic 3-D printed variable pattern nozzle assembly 100 (via Inlet1 port 106 and Inlet2 port 108) the resulting stream of water discharged from orifice 140 has a height or length that is largely defined by the pressure associated with the first stream of water (supplied via Inlet1 port 106) and a conical shape that is largely determined by the pressure associated with the second stream of water (supplied via Inlet2 port 108). For example, FIG. 5C generally shows a pattern (500c) provided by greater water pressure being supplied at Inlet1 port 106, than at Inlet2 port 108 (e.g., the first water stream at seventy-five percent and the second water stream at twenty-five percent). While FIG. 5D generally shows a pattern (500d) provided by equal water pressure being supplied at each of Inlet1 port 106 and Inlet2 port 108 (e.g., the first water stream at fifty percent and the second water stream at fifty percent). FIG. 5E generally shows a pattern (500e) provided by less water pressure being supplied at Inlet1 port 106, than at Inlet2 port 108 (e.g., the first water stream at twenty-five percent and the second water stream at seventy-five percent). Thusly, by adjusting the pressures of the first and second streams of water a relatively infinite number of spray patterns can be achieved that are roughly within a cylindrical envelope having a height defined by the maximum pressure that can be applied to the first stream and a conical breadth defined by the maximum pressure that can be applied to the second stream.

In various embodiments, monolithic 3-D printed variable pattern nozzle assembly 100 may allow water (or other liquid media) supply enhancements. For example, monolithic 3-D printed variable pattern nozzle assembly 100 may be configured with the ability to modify the external dimensions to accommodate attachment in a wide variety facility conditions, such as a variety of water supply configurations, including a variety of water pump configurations. That is, separate pumps may be employed to provide the first and second water streams, or may be replaced with a single 3-way analog valve so as to allow the use of a single stream of water controlled by the valve rather than an expensive and redundant pump system. Alternatively, a first pump may be replaced with a 2-way actuated valve. A second pump may also be replaced with a 2-way actuated valve. Both pumps may also be replaced with a combination of the above disclosed valves. Further, the water pumps providing the first and second stream of water can be controlled so as to produce a spray pattern that changes over time. Additionally, Further, the water pumps that are supplying water to several of monolithic 3-D printed variable pattern monolithic 3-D printed variable pattern nozzle assembly 100 can be controlled to produce a plurality of spray patterns that change over time.

In light thereof, monolithic 3-D printed variable pattern nozzle assembly 100 assembly may be configured to improve the balance (flow ratio) between the vertical stream and the conical spray. Likewise, monolithic 3-D printed variable pattern nozzle assembly 100 may also be configured with tuned dimensions to enhance the efficiency of the nozzle requiring less pressure from the water supply.

Additionally monolithic 3-D printed variable pattern nozzle assembly 100 may be configured to enhance the performance of tangential injector 102/diffuser 130. Monolithic 3-D printed variable pattern nozzle assembly 100 may also be configured to enhance the reduced the overall height of the assembly. Likewise, monolithic 3-D printed variable pattern nozzle assembly 100 may be configured with the ability to scale the nozzle to a relatively infinite number of sizes. In accordance therewith, monolithic 3-D printed variable pattern nozzle assembly 100 may be configured with the ability to modify the external dimensions to be an artistic or recognizable shape (aesthetic enhancement). The 3-D printed nozzle assembly may be configured with the ability to modify the top of the nozzle to be low and smooth for application in a walkable surface. The 3-D printed nozzle assembly may be configured with the ability to brand or identify the nozzle with integral shapes and lettering.

Monolithic 3-D printed variable pattern nozzle assembly 100 may be configured with the ability to manufacture the nozzle from a variety of materials. Likewise monolithic 3-D printed variable pattern nozzle assembly 100 may be configured with the ability to make the nozzle in a variety of opacities from clear to fully opaque. Monolithic 3-D printed variable pattern nozzle assembly 100, particularly, by way of example, monolithic 3-D printed variable pattern nozzle assembly 100b of FIGS. 2 and 3, may be configured to with the ability to internally light the nozzle to create a glowing variable pattern nozzle.

Several embodiments of monolithic 3-D printed variable pattern nozzle assembly 100 are possible. For example, instead of using a portion of cylindrical tube 116 to define the first and second section portions 104, 110, the interior surface of tangential injector 102 (i.e., (including) the interior surface of tangential diffuser 130) can define at least a portion of second section portion 110. That is, as illustrated, the integrally formed nature of illustrated monolithic 3-D printed variable pattern nozzle assembly 100 shows cylindrical tube 116 integrally defining first section portion 104 and second section portion 110, with an interior surface of tangential diffuser 102 defining a portion of second section portion 110. In some embodiments, it is possible to implement tangential injector 102, and its tangential diffuser portion 130, to receive the second stream of water from separate water supply lines. In some embodiments, it may be possible to change the angle at which tangential diffuser 102 injects the second stream of water into second section portion 110. In the illustrated embodiment, the second stream of water is injected substantially perpendicular to the radius of cylindrical tube 116 (i.e., in a tangential fashion). However, the second stream of water may be injected into second section portion 110 at an angle that has a radial component (provided there is still a tangential component). Furthermore, in some embodiments an angle of injection may be tilted. That is, tangential diffuser 130 may inject the second stream of water into second section portion 110 through passages 134a through 134d that lie in a plane that is substantially perpendicular to the longitudinal axis 118. The second stream can be injected into the second section portion at an angle to the noted perpendicular plane(provided there is still a tangential or rotational component to the second stream) in such other embodiments.

Illustrated herein are various views of exemplary sized 3-D printed nozzle assembly embodiments, with FIGS. 1 through 5 showing exemplary embodiments having an integrated nozzle formed in monolithic 3-D printed variable pattern nozzle assembly 100. However, FIG. 6 is a perspective view showing an embodiment of a removable nozzle tip 610 provided with a version of the FIG. 1 3-D printed variable pattern nozzle assembly 600. To wit, in various embodiments, the 3-D printed nozzle assembly may be provided with printed threads, which requires no secondary machining processes. Threads may be added to the top of the nozzle to accommodate a variety of enhancements. Furthermore, threads provide an ability to replace the nozzle tip due to wear or damage. Threads provide an ability to create a variety of nozzle patterns which are interchangeable. Threads provide an ability to create nozzle tips from a variety of materials for greater durability. Threads also provide an ability to create nozzle tips in a variety of opacities from clear to fully opaque. While threads may be machined on various other materials, this is an expensive secondary process in terms of material cost and labor cost to provide adequate tolerances for a useful nozzle assembly.

In various embodiments, the removable nozzle orifice, which may include a threaded external screw-on tip provided by the removable nozzle, may be provided in various hole patterns or sizes. Various embodiments of the 3-D printed nozzle assembly further may provide an ability to create a clear nozzle tip facilitating the transmission of light. For example, a clear cap (e.g., the removable nozzle tip 610 or integrated tip 136 (orifice 140) formed in the 3-D printed nozzle assembly) may be configured to transmit light. Furthermore, the clear cap or other structure of the nozzle, such as first hollow section portion 104, may include a(n) (integrally formed) lens configured to receive light from LED light source 142 to spread light, and/or otherwise, facilitate illuminating the 3-D printed nozzle assembly and/or the third stream of water. This lens may include, but is not limited to, a Fresnel lens (such as the type used in light houses) or other lens structures to provide a desired lighting effect.

Various embodiments of the 3-D printed nozzle assembly further may provide an ability to form the clear nozzle tip with optical lensing to change the photometric from flood to spot. Various embodiments of the 3-D printed nozzle assembly further may provide an ability to create a metallic nozzle tip with mounting means to hang the nozzle from the top.

FIG. 7 illustrates an exemplary 3-D printed nozzle assembly 700 that includes removable object top 710, for selective illumination of the 3-D printed nozzle assembly, water flow, and the object top. As discussed herein, lighting may be provided with, or without, this object top. FIG. 7 shows an embodiment of a removable object top (710) deployed together with monolithic 3-D printed variable pattern nozzle assembly 100 (as illustrated, with FIG. 2 embodiment 100*b* of the present monolithic 3-D printed variable pattern nozzle assembly) for selective illumination of 3-D printed nozzle assembly 100, water flow 720, and object top 710. Accordingly, with respect to various embodiments, FIG. 8 is a partially exploded side diagrammatic elevation illustration of embodiment 700 of removable object top 710 deployed together with the FIG. 2 embodiment 100*b* of the present monolithic 3-D printed variable pattern nozzle assembly, from FIG. 7.

In various embodiments, the object top may be removable, or it may be a permanent fixture to the remainder of the 3-D printed nozzle assembly. That is, object top 710 may be integral to monolithic 3-D printed variable pattern nozzle assembly 100, integral to nozzle tip 136, or the like. Alternatively, 3-D printed nozzle assembly 100 may be configured with an ability to modify the external dimensions to accommodate mounting of various accessories, such as object top 710, to nozzle assembly 100. The object top may include (internal) screw threads corresponding to the 3-D printed nozzle assembly. However, the object top may interface with the 3-D printed nozzle assembly using alternative engagement mechanisms or other attachment features.

Figure 11:
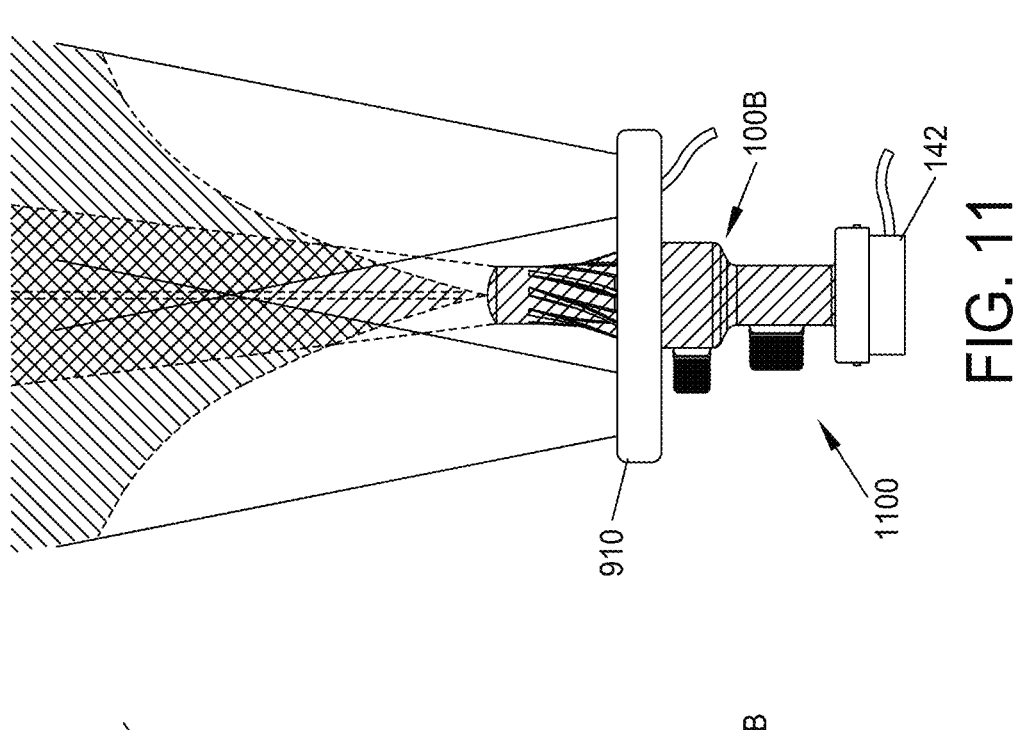
FIG. 11 illustrates an example illumination configuration using a combination of both an LED ring light and the nozzle light in conjunction with the FIG. 2 embodiment of the present 3-D printed nozzle assembly.
Figure 10:
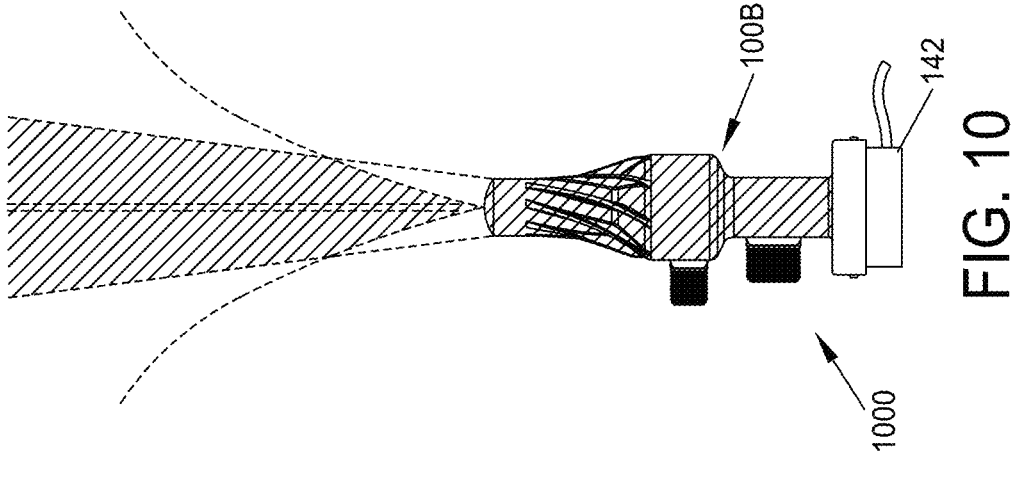
FIG. 10 illustrates an example illumination configuration using a nozzle light in conjunction with the FIG. 2 embodiment of the present 3-D printed nozzle assembly.
Figure 9:
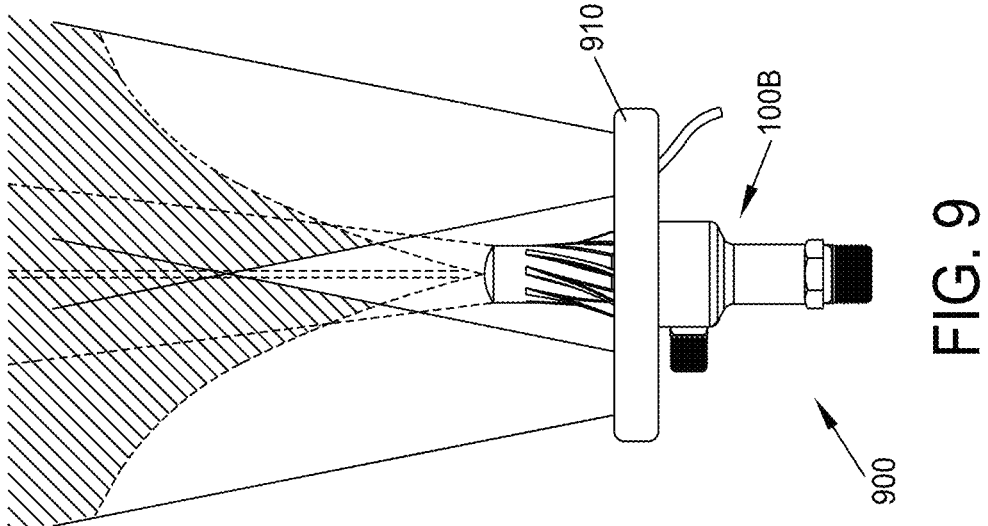
FIG. 9 illustrates an example illumination configuration using a light emitting diode (LED) ring light, in conjunction with the FIG. 1 embodiment of the present 3-D printed nozzle assembly.
Figure 12:
FIGS. 12 through 19 are color photographs that illustrate exemplary displays and display systems of multiple 3-D printed nozzle assemblies employing the FIG. 2 embodiment of the present 3-D printed nozzle assembly.
Figure 13:
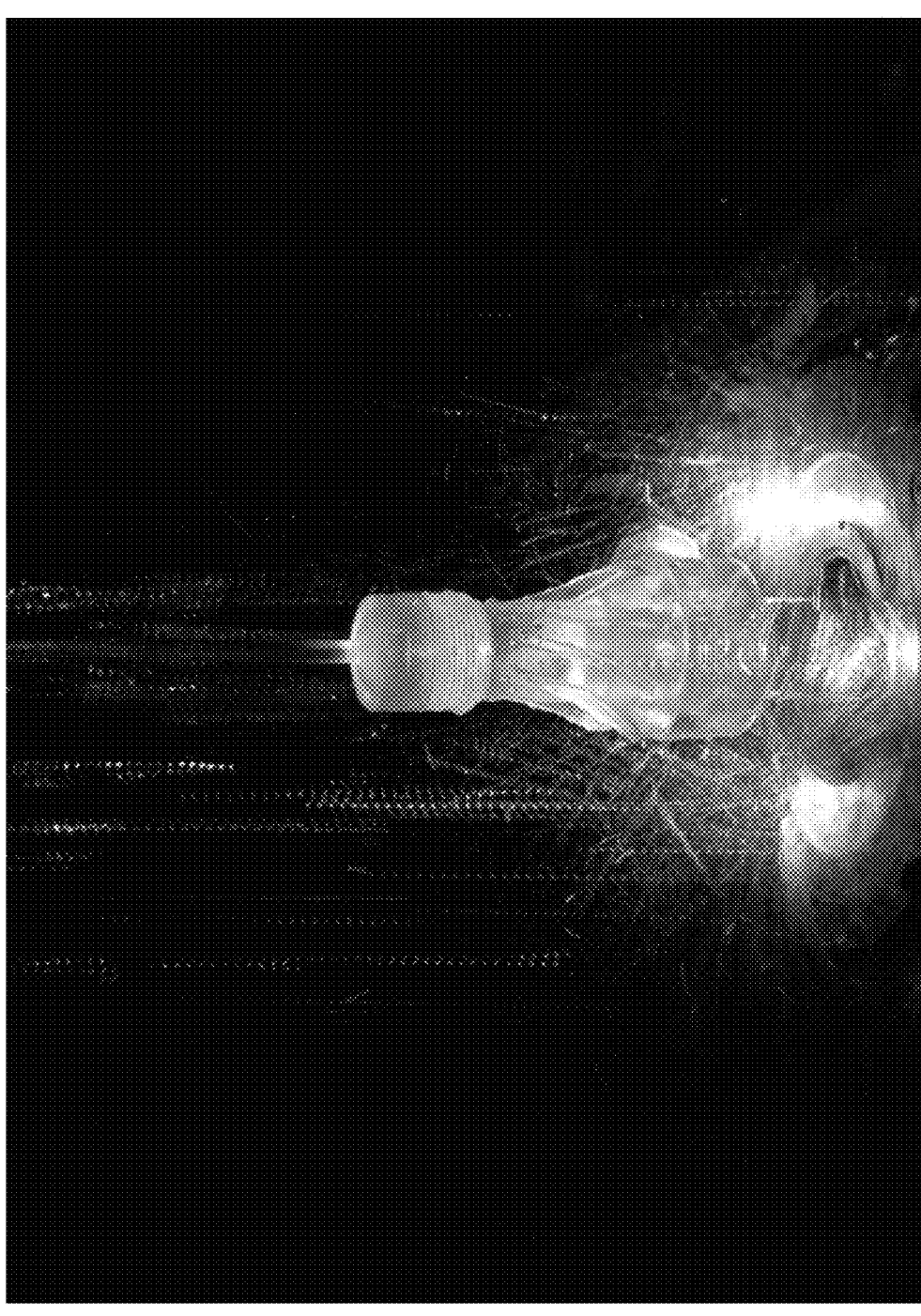
Figure 14:
Figure 15:
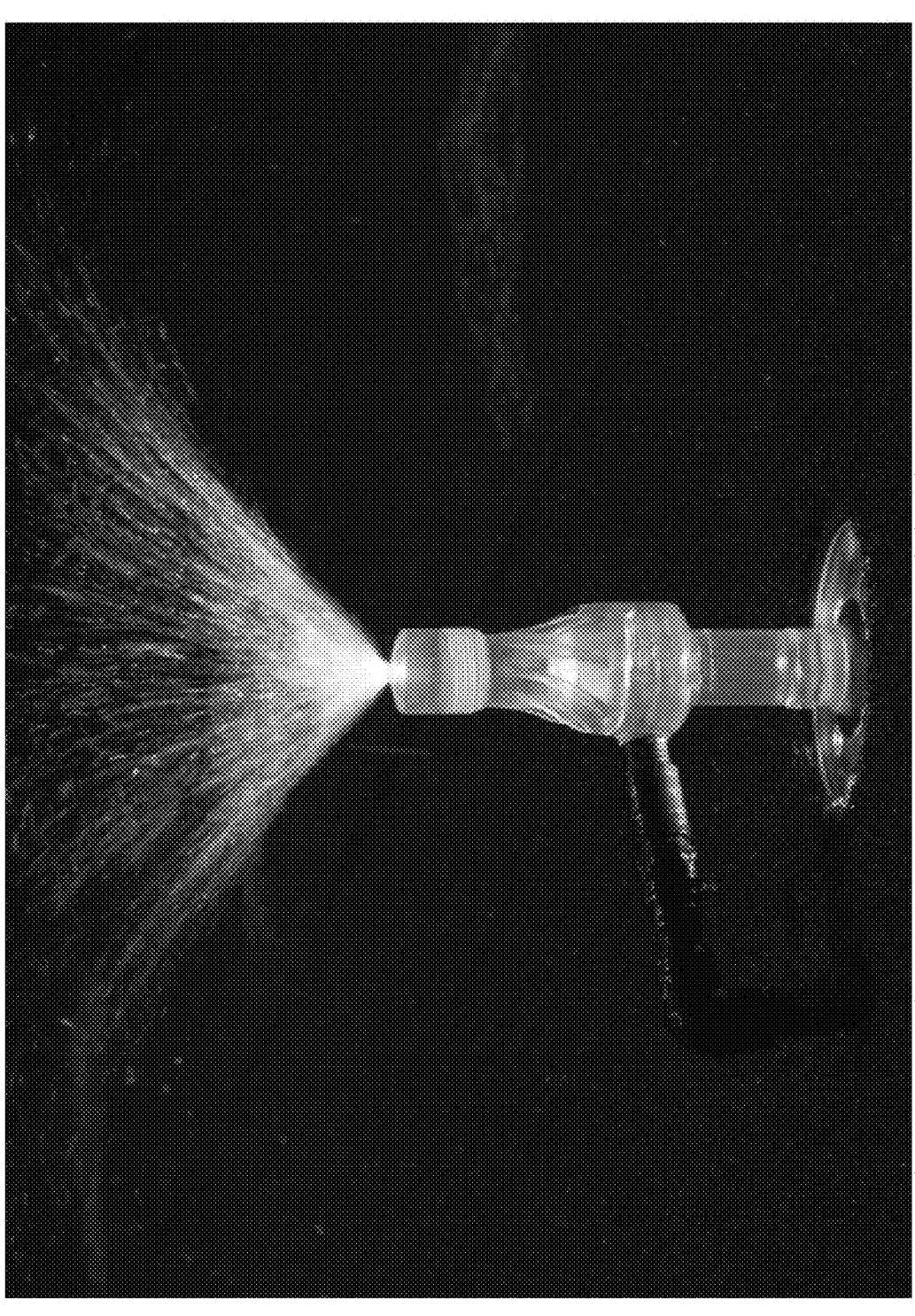
Figure 16:
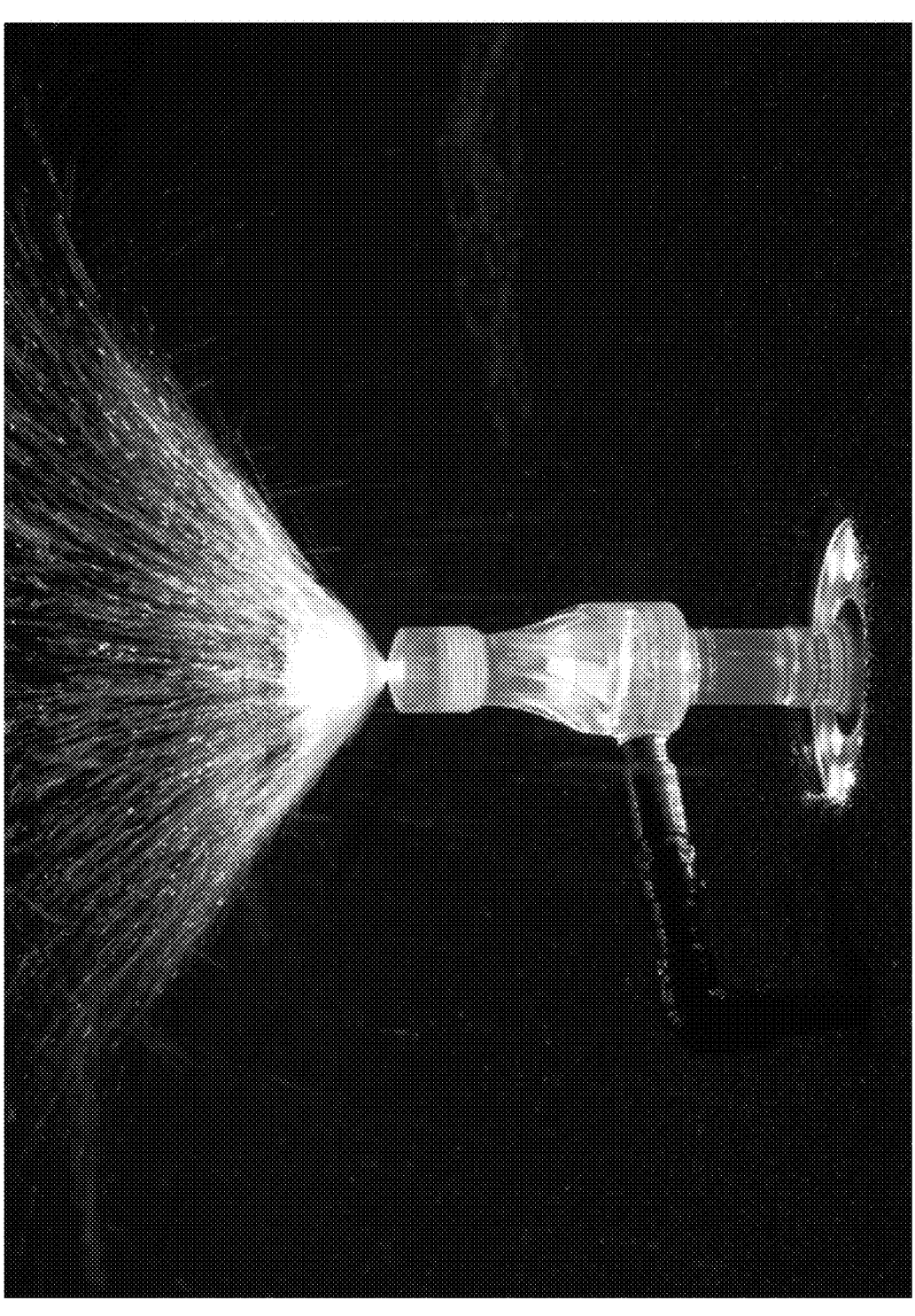
Figure 17:
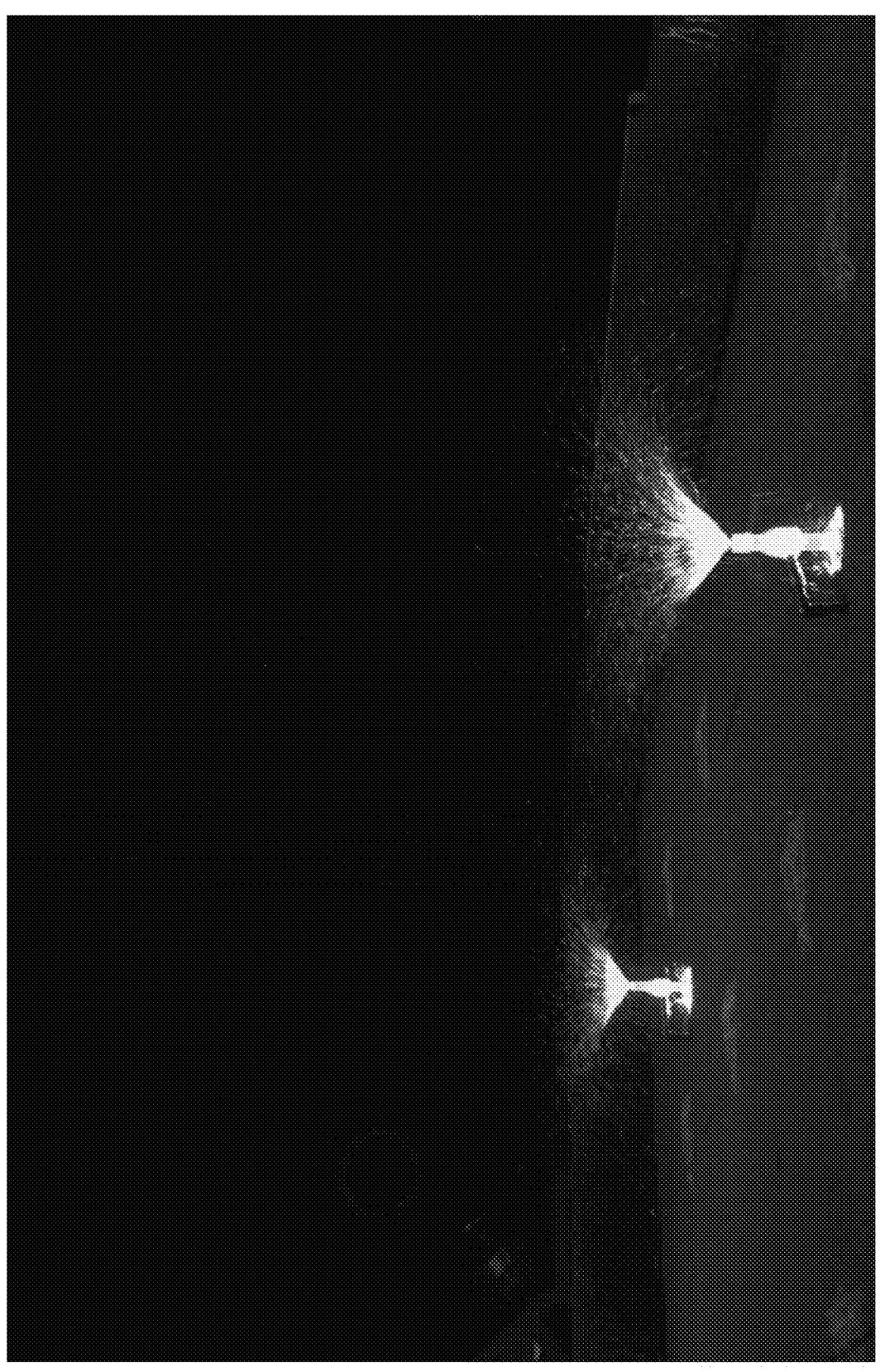
Figure 18:
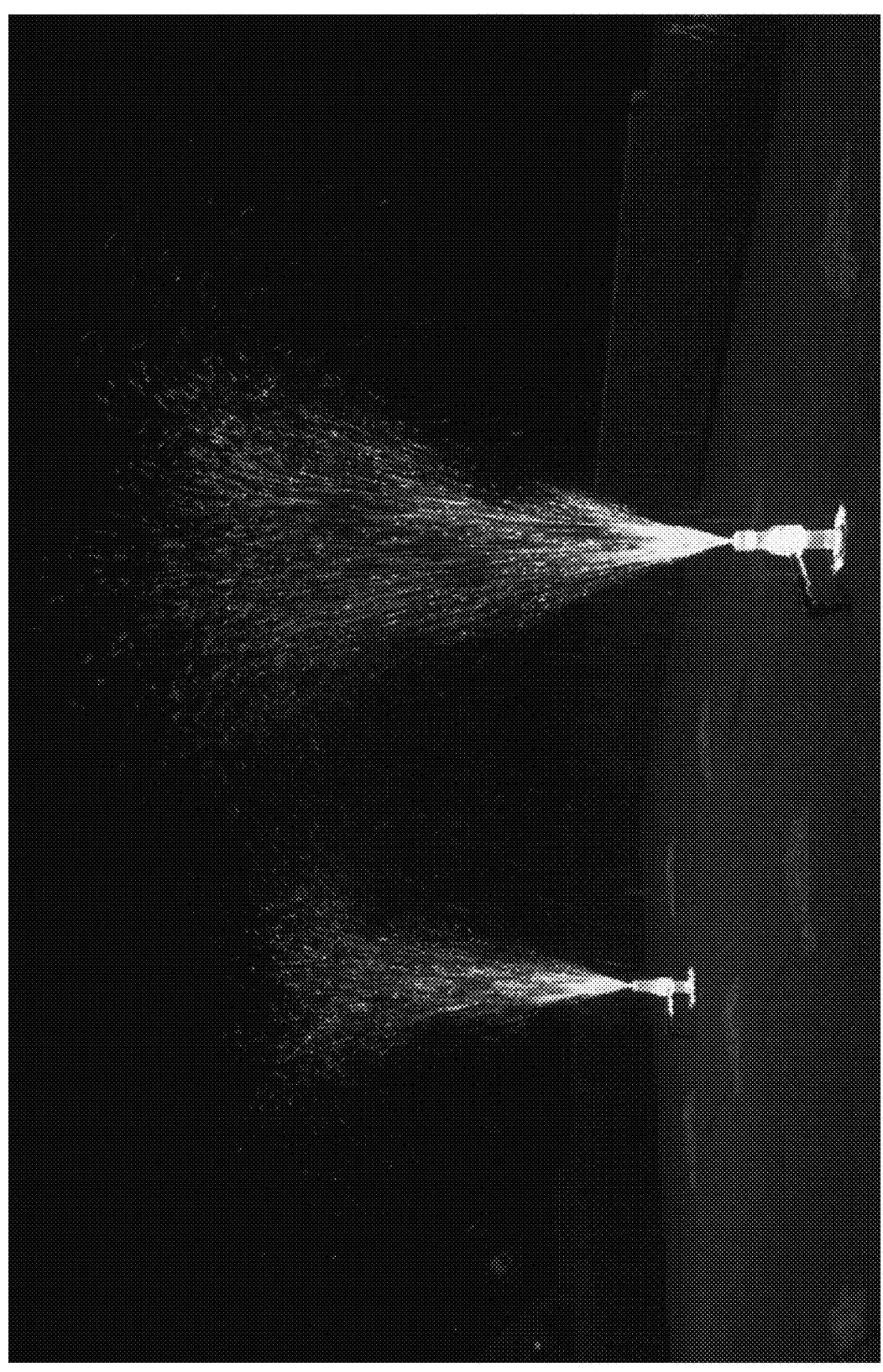
Figure 19:
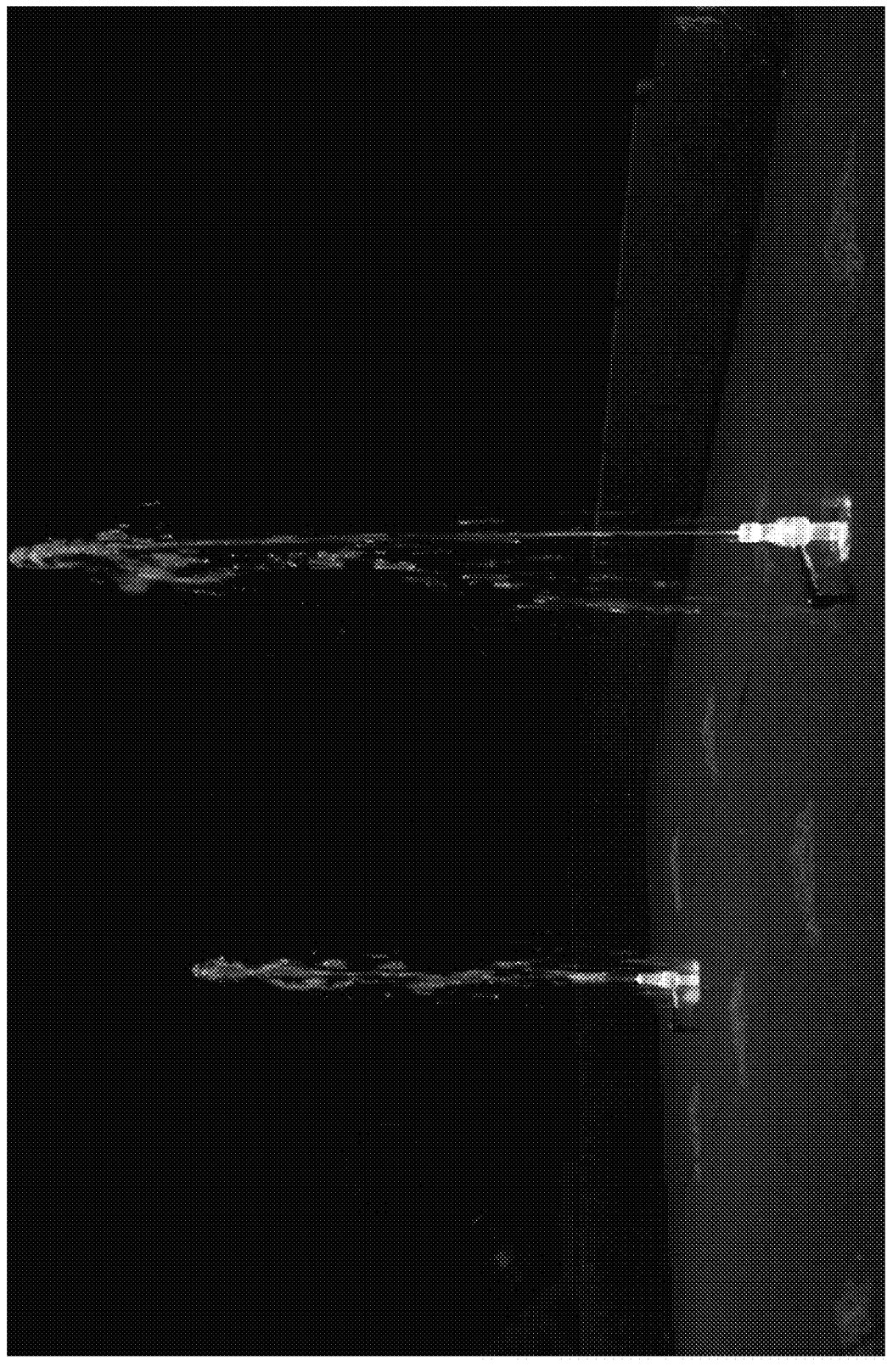

FIGS. 9 through 11 illustrate various illumination configurations using an LED ring light, a nozzle light, and a combination of both the LED ring light and the nozzle light. FIG. 9 illustrates example illumination configuration 900 using light emitting diode (LED) ring light 910, in conjunction with FIG. 1 embodiment of present 3-D printed nozzle assembly 100*a*. FIG. 10 illustrates example illumination configuration 1000 using nozzle light 142 in conjunction with FIG. 2 embodiment of present 3-D printed nozzle assembly 100*b*. FIG. 11 illustrates example illumination configuration 1100 using a combination of both nozzle light 142 of the FIG. 2 embodiment of the present 3-D printed nozzle assembly 100*b*, in conjunction with LED ring light 910. As discussed herein, the use of a 3-D printing material which provides a translucent or clear material, allows various lighting configurations which are not possible with traditional metal or many other fountain nozzle materials. The various LED structures may be removable or may be provided in an integrated configuration with the 3-D printed nozzle assembly.

FIGS. 12 through 19 are color photographs that illustrate exemplary displays and display systems of multiple 3-D printed nozzle assemblies employing FIG. 2 embodiment 100*b* of the present monolithic 3-D printed variable pattern nozzle assembly 100. FIGS. 12 through 20 show various water patterns together with various lighting configurations at different ones of the multiple 3-D printed nozzle assemblies. Light is shown emanating through the 3-D printed nozzle assembly and the water is allowed to illuminate from light fixtures which are unimpeded through the walls of the respective 3-D printed nozzle assembly.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method for producing a variable lighted water pattern, the method comprising:

selectively providing a first stream of water to a first end of a translucent cylindrical tube;

selectively providing a second stream of water to a structure integrally formed with the translucent cylindrical tube, the structure causing the second stream of water to rotate about a rotational axis;

merging the first stream of water with the second stream of water in the translucent cylindrical tube, such that the longitudinal axis of the translucent cylindrical tube is other than perpendicular to the rotational axis of the second stream of water, the first and second streams of water forming a third stream of water;

providing the third stream of water to an exterior environment from the translucent cylindrical tube; and at least one of (1) varying a volume of the first stream of water, changing a height of the third stream of water in the exterior environment and (2) varying a volume of the second stream of water, changing lateral dispersion of the third stream of water in the external environment;

directing light at least one of through and about the translucent cylindrical tube, illuminating at least one of the translucent cylindrical tube and the water streams;

wherein the lighting assembly is an LED light source positioned at an end in opposition to a third translucent hollow section portion directing the third stream of water to the exterior environment;

wherein a first hollow section portion at the first end of the translucent cylindrical tube comprises an integrally formed lens configured to receive light from the LED light source.

2. The method for producing a variable lighted water pattern in accordance with claim 1 further comprising providing a lighting assembly configured to direct light through at least a first translucent hollow section portion, a second translucent hollow section portion, and a third translucent hollow section portion, illuminating the translucent cylindrical tube and/or one or more of the water streams.

3. The method for producing a variable lighted water pattern in accordance with claim 1, wherein the lighting assembly comprises a light emitting diode (LED) ring assembly positioned about the translucent cylindrical tube.

4. The method for producing a variable lighted water pattern in accordance with claim 1, further comprising an attachable object top providing an orifice for water flow.

5. The method for producing a variable lighted water pattern in accordance with claim 4, wherein the attachable object top comprises a translucent material configured to allow illumination from a lighting assembly.

6. A method for producing a variable lighted water pattern, the method comprising:

providing a monolithic 3-D printed nozzle assembly configured to produce a variable water pattern comprising:

a first translucent hollow section portion comprising an integrally formed translucent wall portion, the first hollow section portion configured to receive a first stream of water and provide a linear stream of water moving along a linear axis;

a translucent tangential injector portion integrally formed with the first translucent hollow section portion, the translucent tangential injector portion defining at least one passageway, the translucent tangential injector portion configured to receive a second stream of water and direct the second stream of water to rotate about a rotational axis using the at least one passageway;

a second translucent hollow section portion comprising the translucent wall portion of the first hollow portion, integrally formed with an outer translucent wall portion of the second hollow portion, the second hollow section portion configured to receive the second stream of water and to provide a rotating stream of water that rotates about a rotational axis from the tangential injector portion, such that the rotational axis is other than perpendicular to the longitudinal axis, providing a third stream of water formed from the first and second streams of water;

a third translucent hollow section portion comprising the translucent wall portion of the first hollow portion integrally extending from the second hollow portion, the third translucent hollow section portion configured to receive the linear stream of water and the rotating stream of water, such that the linear axis and the rotational axis are non-perpendicular, and provide a third stream of water formed by the linear stream of water and the rotating stream of water; and a nozzle tip portion configured to receive the third stream of water and direct the third stream of water into an exterior environment via an orifice;

selectively providing the first stream of water to the first translucent hollow section portion;

selectively providing the second stream of water to the second translucent hollow section portion;

forming a third stream of water from the first stream of water and the second stream of water;

providing the third stream of water to the third translucent hollow section; and directing the third stream of water into the exterior environment via the orficie of the nozzle tip portion received from the third translucent hollow section.

7. The method for producing a variable lighted water pattern in accordance with claim 6, wherein the second hollow section portion comprises an integrally formed tangential diffuser defined by the translucent wall portion of the first hollow portion integrally formed with the outer translucent wall portion of the second hollow portion, the integrally formed tangential diffuser comprising a plurality of passages defined in the translucent wall portion of the first hollow portion and configured to direct the second stream of water about the rotational axis.

8. The method for producing a variable lighted water pattern in accordance with claim 6, wherein the plurality of passages comprises a plurality of exit ports that are arranged in a circle.

9. The method for producing a variable lighted water pattern in accordance with claim 6, wherein the second hollow section portion further comprises an integrally formed plenum defined between the translucent wall portion of the first hollow portion and the outer translucent wall portion of the second hollow portion, the plenum comprising:

an integrally formed inlet port configured to receive the second stream of water; and an integrally formed tangential diffuser.

10. The method for producing a variable lighted water pattern in accordance with claim 6, wherein the second hollow section portion comprises an integrally formed plenum defining a torus shape and an integrally formed inlet port located to direct at least a portion of the second stream of water with a tangential component relative to a radius of the plenum torus shape.

11. The method for producing a variable lighted water pattern in accordance with claim 6, wherein the nozzle tip portion is translucent and is integral with at least the first hollow section portion, the second hollow section portion, and the third hollow section portion, receiving the third stream of water and directing the third stream of water into the exterior environment by an orifice.

12. The method for producing a variable lighted water pattern in accordance with claim 6, further comprising illuminating at least one of the printed 3-D nozzle assembly and one or more of the water streams with a lighting assembly configured to direct light through at least the first translucent hollow section portion, the second translucent hollow section portion, the third translucent hollow section portion, and the translucent nozzle tip portion.

13. The method for producing a variable lighted water pattern in accordance with claim 12, wherein the lighting assembly comprises an LED ring assembly positioned about the monolithic 3-D printed nozzle assembly.

14. The method for producing a variable lighted water pattern in accordance with claim 12, wherein the lighting assembly comprises an LED light source positioned at an end in opposition to the third hollow section portion providing the third stream of water.

15. The method for producing a variable lighted water pattern in accordance with claim 14, wherein the first hollow section portion comprises an integrally formed lens configured to receive light from the LED light source.

16. The method for producing a variable lighted water pattern in accordance with claim 6, further comprising a removable object top providing an orifice for water flow.

17. The method for producing a variable lighted water pattern in accordance with claim 16, wherein the removable object top comprises a translucent material configured to allow illumination from a lighting assembly.

* * * * *